United States Patent [19]
Heckner

[11] Patent Number: 5,558,005
[45] Date of Patent: Sep. 24, 1996

[54] MULTI-SECTION ACTUATOR

[75] Inventor: Christoph Heckner, Bielefeld, Germany

[73] Assignee: Dürkopp Adler Aktiengesellschaft, Germany

[21] Appl. No.: 541,498

[22] Filed: Oct. 10, 1995

Related U.S. Application Data

[63] Continuation of Ser. No. 167,421, Dec. 15, 1993.

[30] Foreign Application Priority Data

Dec. 22, 1992 [DE] Germany ............................ 42 43 497.1

[51] Int. Cl.$^6$ .................................................. F01B 15/00
[52] U.S. Cl. .............................. 92/66; 92/13.3; 91/167 R; 91/173
[58] Field of Search ........................... 91/167 R, 173; 92/13, 13.3, 52, 53, 66, 117 A, 165 R

[56] References Cited

U.S. PATENT DOCUMENTS

| | | | |
|---|---|---|---|
| 2,372,923 | 4/1945 | Yerger | 91/167 |
| 2,544,793 | 3/1951 | Kelly | 92/13 |
| 2,969,042 | 1/1961 | Litz et al. | 91/167 |
| 3,913,457 | 10/1975 | Hawley | 92/13.3 |
| 4,412,498 | 11/1983 | Scholl | 112/313 |

FOREIGN PATENT DOCUMENTS

| | | | |
|---|---|---|---|
| 3632355 | 4/1988 | Germany . | |
| 4375 | of 1882 | United Kingdom | 92/53 |
| 281335 | 4/1928 | United Kingdom | 92/53 |
| 2092229 | 8/1982 | United Kingdom . | |

OTHER PUBLICATIONS

Control Engineering, "Hydraulic Digital Actuator" by A. H. Delmege et al., Feb. 1965, pp. 69–70.

Primary Examiner—F. Daniel Lopez
Attorney, Agent, or Firm—Ostrolenk, Faber, Gerb & Soffen, LLP

[57] ABSTRACT

Actuator (1) adapted to be actuated by pressurized fluid as shown for example in FIG. 3, having a plurality of piston-cylinder units (A, B, C, D, E, F) arranged one behind the other and displaceable in the direction of a longitudinal axis (9), in which adjacent parts such as a piston of one unit and a cylinder of the adjacent unit are combined to form a connecting part. The individual piston-cylinder units (A, B, C, D, E, F) are so dimensioned in their lengths that the piston-cylinder units can be provided with different respective stroke lengths (ha, hb, hc, hd, he, hf). The stroke lengths can be varied by devices such as screws with hexagonal sockets (26, 110, 111, 113), and adjusted by a screw-turning tool (34). The actuator (1) has a small number of inexpensive individual parts and is easy to manufacture.

24 Claims, 3 Drawing Sheets

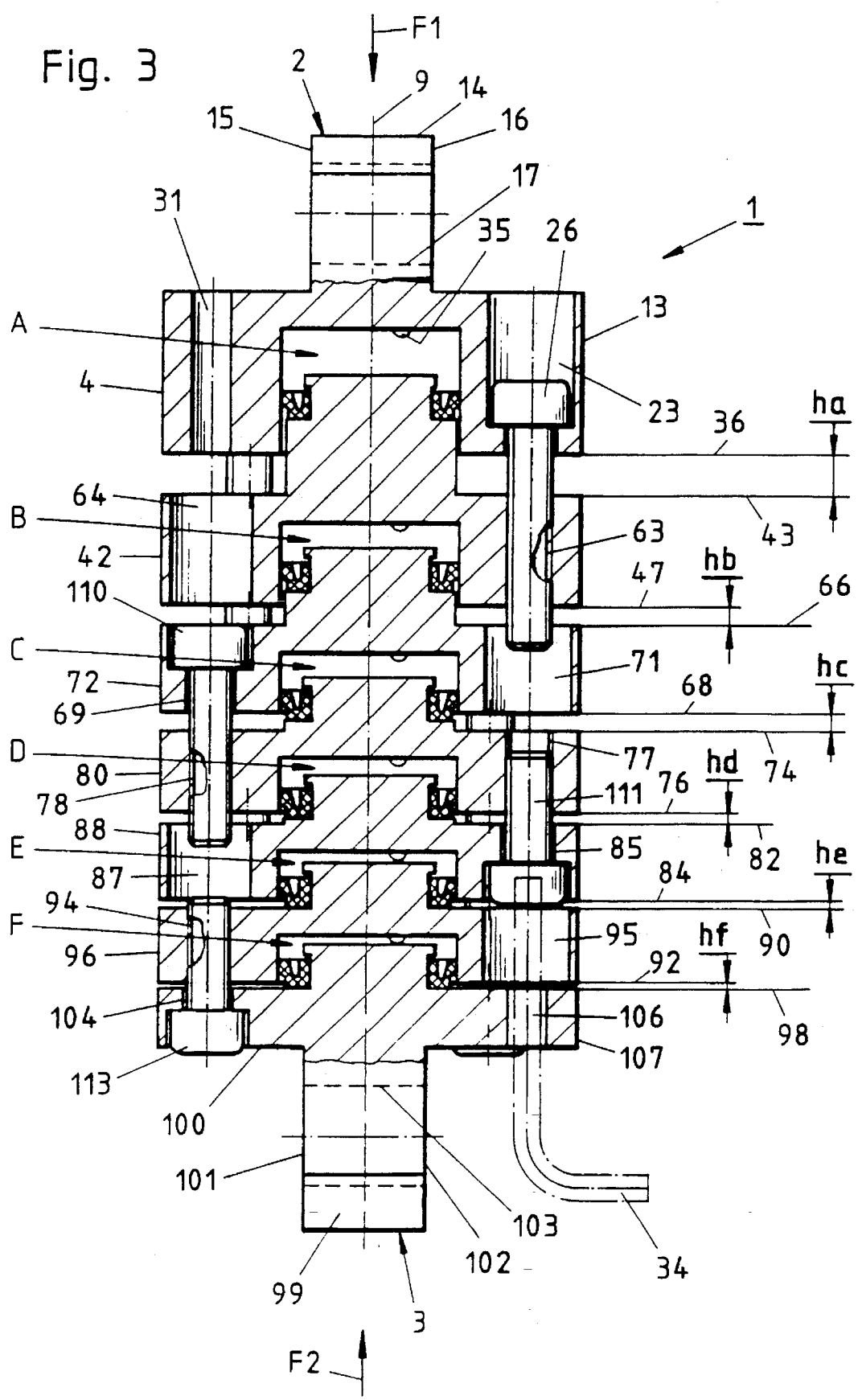

MULTI-SECTION ACTUATOR

This is a Continuation of application Ser. No. 08/167,421 filed on Dec. 15, 1993, now abandoned.

BACKGROUND OF THE INVENTION

The present invention relates to an actuator which is adapted to be actuated by pressurized fluid and includes a plurality of interconnected pistons and cylinders.

Federal Republic of Germany 36 32 355 A1, commonly owned with the present application, discloses an actuator adapted to be actuated by pressurized fluid, which has piston-cylinder units arranged one behind the other, the pistons and the cylinders of adjacent units being combined to form one part. In this actuator, the manufacture of the parts which interconnect the pistons does not present any substantial difficulties. However, the manufacture of the parts which interconnect the cylinders can be effected only at relatively high expense. This is due to the large number of parts required, the control of the tolerances as to position and shape, the required quality of manufacture with respect to certain dimensions, the cost of the cylindrical tubes, and the relatively high cost of assembly of the parts.

Furthermore, the seal used in this construction unfavorably leads away from a compact structural shape, since such seals must be increasingly thicker and stabler with increasing piston-cylinder diameters and increasing operating pressures of the pressure fluid.

Finally, the reliability in operation of the actuator is also impaired as a result of the parts which are each composed of a plurality of individual parts. The patent refers to the design of the multiposition cylinder to the effect that several of its parts are to be developed as injection moldings which can be produced at favorable price. However, this does not award the difficulties with respect to the seal separating the cylinders.

The article "Hydraulic Digital Actuator", in *Control Engineering*, February 1965, pages 69 and 70, discloses an actuator operable by pressurized fluid in which a plurality of pistons are displaceably contained within a cylindrical tube. In order to establish different operating stroke lengths, each of the pistons is developed with a recess at one end and with a T-shaped extension at the other end. The manufacture of such pistons involves considerable expense due to the considerable amount of necessary machining work and due to complicated shapes in the manufacture by injection molding. Furthermore, this construction results in an actuator of excessive length.

Also of interest is GB 2,092,229 which discloses a pressure-fluid-operated positioning device having cylinders arranged in series and pistons and floating pistons movable therein between stops which are movable from the outside. Due to the arrangement of end plates closing the cylinders and the floating intermediate pistons, the device requires a considerable number of seals, which negatively affect its reliability. Furthermore, the length added by the end parts and the stops prevents the device from being relatively compact and from having a short overall length.

The disclosures of these and all other prior art materials mentioned herein are expressly incorporated by reference.

SUMMARY OF THE INVENTION

A principal object of the present invention is to improve upon this type of actuator so as to obtain a reduction in its cost of manufacture, a relatively short structural length, and an increase in its dependability in operation.

This object is achieved in accordance with the invention by an actuator adapted to be actuated by pressurized fluid, comprising a plurality of piston-cylinder units; each piston-cylinder unit comprising a piston within a cylinder, the piston being arranged for movement within the cylinder along a longitudinal axis of the actuator; the piston-cylinder units being arranged adjacent to each other and interconnected so that an overall stroke length of the actuator corresponds to a sum of respective stroke lengths of the pistons within the cylinders; means for setting a respective stroke length of each piston within the corresponding cylinder; the actuator comprising a connecting unit, the connecting unit integrally comprising the piston of one of the piston-cylinder units and the cylinder of another adjacent piston-cylinder unit; the connecting unit having a channel for receiving and guiding the pressurized fluid into the cylinder of the connecting unit.

The combining of pistons and cylinders into piston-cylinder units which are arranged adjacent to each other leads to a reduction in the number of structural parts and makes it possible to dispense with threaded attachments. In this way, the expense for bolts, for the production of holes and threads, and for assembly is reduced so that, overall, a lower manufacturing cost results. In addition, the combining of pistons and cylinders into adjacent piston-cylinder elements leads to structural parts without regions of thin wall thickness, resulting in structural parts of increased load-bearing capacity and high reliability which can be manufactured more successfully.

The actuator preferably comprises a first end part at one end of the actuator, having a piston, and a second end part at the other end of the actuator, having a cylinder. These measures result in a cost-saving construction.

The first and second end parts and the connecting part may have continuous outer surfaces free of conventional cut-outs and holes formed for receiving screws, leading to a stiffer construction of the cylinder and one which can support higher loads. Furthermore, manufacturing advantages result from this feature regardless of whether the part is produced as a machined part, as a plastic injection molding, or as a die casting.

The means for fixing a respective stroke length may comprise one or more screws which interconnect the connecting parts to each other, or interconnect the end parts and the connecting parts so as to limit a relative stroke length therebetween. The screws may be received in recesses or holes formed in the end parts and/or the connecting parts, and thereby accessible for being turned by a screw-turning tool. Such means make it possible to set the stroke lengths of the individual piston-cylinder units with screws which are accessible by ordinary tools without difficulty.

The channel for receiving the pressurized fluid extends from the continuous outer surface of the connecting unit into the cylinder within the connecting unit.

The channel is preferably straight and arranged radially with respect to the actuator. This leads to an actuator which can be easily manufactured at favorable cost and which furthermore can be manufactured as a plastic injection molding or as a die casting.

The respective channels of all the piston-cylinder units advantageously may be substantially aligned along the direction of the longitudinal axis of the actuator. This results in the advantage of a compact construction.

Other features and advantages of the present invention will become apparent from the following description of the invention which refers to the accompanying drawings.

BRIEF DESCRIPTION OF THE DRAWINGS

FIG. 3 is a cross-sectional view taken through the actuator along the section line III—III in FIG. 1, and in which the upper and lower parts correspond to a view seen in the direction of the arrow VI in FIG. 1.

DETAILED DESCRIPTION OF AN EMBODIMENT OF THE INVENTION

Figure 1:
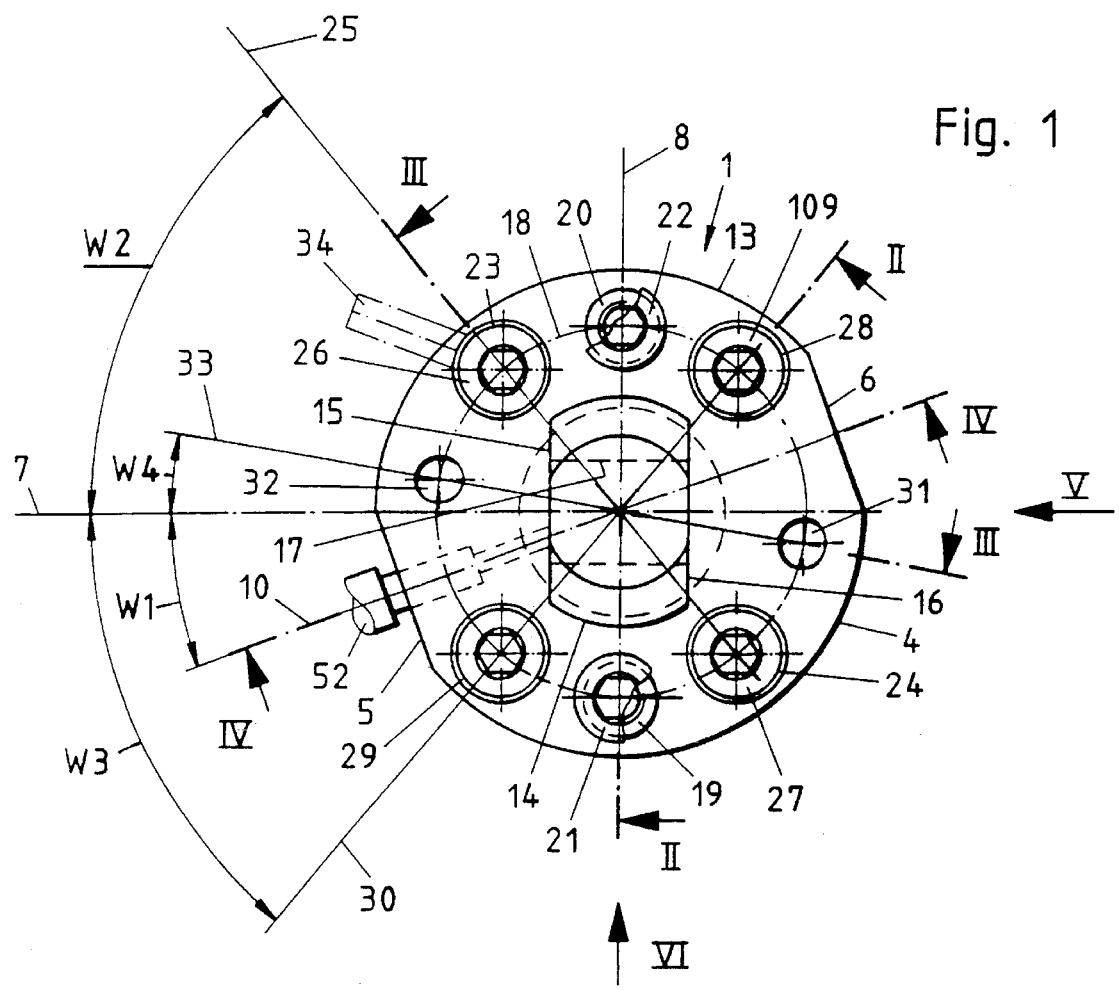
FIG. 1 is a top view of an actuator in accordance with an embodiment of the invention.

An actuator 1 is developed at one end with a first end part 2 and at the other end with a second end part 3. The end part 2 has, as shown in FIG. 1, a flange 4 which has a flattened circular shape, with two diametrically opposed flats 5 and 6. Defined on the flange 4 are transverse dot-dash lines 7 and 8, which intersect at right angles, through the point of intersection of which a longitudinal axis 9 extends. A transverse line 10 extends at a right angle to the flats 5, 6. The line 10 forms an angle W1 with the line 7, which in this example is 20 degrees.

The flange 4 is furthermore developed with a blind hole extending along the longitudinal axis 9, forming a cylinder 11 with a bottom 12. The flange 4 has a continuous outer surface 13 corresponding to the flattened circular shape of the flange and having its length in the direction of the longitudinal axis 9. On the flange 4 there is a lug 14 which has two surfaces 15 and 16 parallel to each other and parallel to the longitudinal axis 9. Through the lug 14 there extends a hole 17 the axis of which intersects the longitudinal axis 9 at approximately a right angle.

The flange 4 is furthermore developed with a plurality of holes which extend parallel to the longitudinal axis 9 and are positioned on a pitch circle 18 (FIG. 1), as will be described in more detail below.

At the points of intersection of line 8 and pitch circle 18 there are two continuous holes (not provided with reference numerals) in which guide rods 19 and 20 are displaceably received. The guide rods 19, 20 and the flange 4 are made of materials, for instance steel and plastic, which form a suitable pair of materials for a maintenance-free sliding bearing. The guide rods 19, 20 are each provided on their ends with threaded holes (not provided with reference numerals) in which screws 21, 22 in the form of hex-socket-head cap screws are received. The heads of the screws 21, 22 are larger in diameter than the guide rods 19, 20. In the following description, all screws mentioned below correspond in the shape of their head to the same type of hex-socket-head cap screw.

Furthermore, the flange 4 is developed with recesses or stepped holes 23, 24 which are located at the points of intersection of a line 25 with the pitch circle 18. The line 25 forms an angle W2 with the line 7, 50 degrees in this example. The recesses or stepped holes 23, 24 are identical and are developed in accordance with the view of the stepped hole 23 in FIG. 3. Screws 26, 27 are received, in the recesses or stepped holes 23, 24, with play and therefore in axially displaceable manner.

Furthermore, the flange 4 is developed with recesses or holes 28, 29 which are positioned at the points of intersection of a line 30 with the pitch circle 18. The line 30 forms an angle W3 with the line 7, which is 50 degrees in this embodiment of the invention. The recesses or holes 28, 29 are identical to each other, corresponding in size to the recess or large hole which forms the stepped hole 23, and are developed in accordance with the recess or view of the hole 28 in FIG. 2.

The flange 4 is furthermore provided with recesses or holes 31, 32 which are positioned at the points of intersection of a line 33 with the pitch circle 18. The line 33 forms an angle W4, here 10 degrees, with the line 7. The holes 31, 32 are developed as clearance holes for the unimpeded passage of a screw turning tool 34, such as shown in dot-dash line in the lower part of FIG. 3. This screw-turning tool 34 in this case is an allen wrench, namely a bent piece of profiled steel having a hexagonal cross section which fits the hexagonal sockets of the screws.

Within the flange 4, there is machined a channel 35 which ends in the bottom 12 of the cylinder 11. Further details with respect to the channel 35 are described below.

Finally, the flange 4 is terminated by an edge 36. The edge 36 is provided with a corresponding reference numeral in FIG. 3, the reference-numeral line being used at the same time as a dimension line for reasons of space. The same applies to the edges of the other sections mentioned below.

Figure 4:
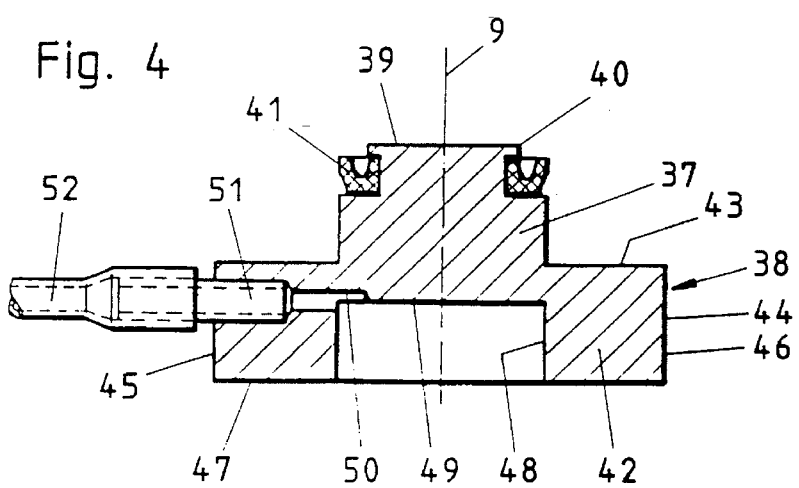
FIG. 4 is a cross-sectional view taken through a connecting part of the actuator along the section line IV—IV in FIG. 1.

Within the cylinder 11 a piston 37 is contained with clearance, and displaceable in the direction of the longitudinal axis 9. The piston 37 is part of a connecting part 38. For ease in understanding, reference is made to FIG. 4 in which the connecting part 38 is shown along the section line IV—IV in FIG. 1.

The piston 37 is developed at its first end 39 with a rim 40 which terminates an angular groove (not provided with a reference numeral). Within it there is received a U-shape sealing cuff 41 which is made of elastic material, for instance, oil-resistant rubber. Such sealing cuffs are known for use in hydraulic or pneumatic cylinders and are available as commercial parts. By the elastic development of the sealing cuff 41, the piston 37 is sealed off within the cylinder 11 from the pressure of the pressurized fluid, such as compressed air or hydraulic liquid, and displaceably received therein. The piston 37 and the cylinder 11 form a first piston-cylinder unit A.

The sealing cuff 41 rests on an annular surface of the groove. From here, the piston 37 extends in the direction of the longitudinal axis 9 towards a flange 42 and terminates at a first edge 43 of the flange 42. The flange 42 is developed in its outer shape in the same way as the flange 4. Accordingly, the flange 42 is provided with flats 44 and 45 and with an outer surface 46. The outer surface 46 corresponds, preferably, to the outer surface 13.

The flange 42 is terminated by a second edge 47 from which a central blind hole extends in the direction of the longitudinal axis 9, forming a cylinder 48 with a bottom 49. With the arrangement described, the piston 37 and the cylinder 48 are positioned aligned with each other and along the longitudinal axis 9. At a right angle to the flat 45, there is then arranged within the flange 42 a stepped blind hole (not numbered) extending toward the longitudinal axis 9, which terminates at the bottom 49 and forms a linear channel 50. The channel 50 is connected with a hose 52 for the pressurized fluid via a connecting tube 51 forced into the blind hole.

The channel 35 which debouches into the cylinder 11 is also developed in a manner corresponding to the development of the channel 50 with the connecting tube 51 and the hose 52.

The first connecting part 38, as well as four additional connecting parts 53, 54, 55, 56 and the part 3, are formed on their respective flanges 42, 57, 58, 59, 60 and 61, with continuous holes (not designated by reference numerals). The positions of these holes are defined by the points of intersection of the line 8 with the pitch circle 18. The guide rods 19, 20 are displaceably received within the holes.

Figure 2:
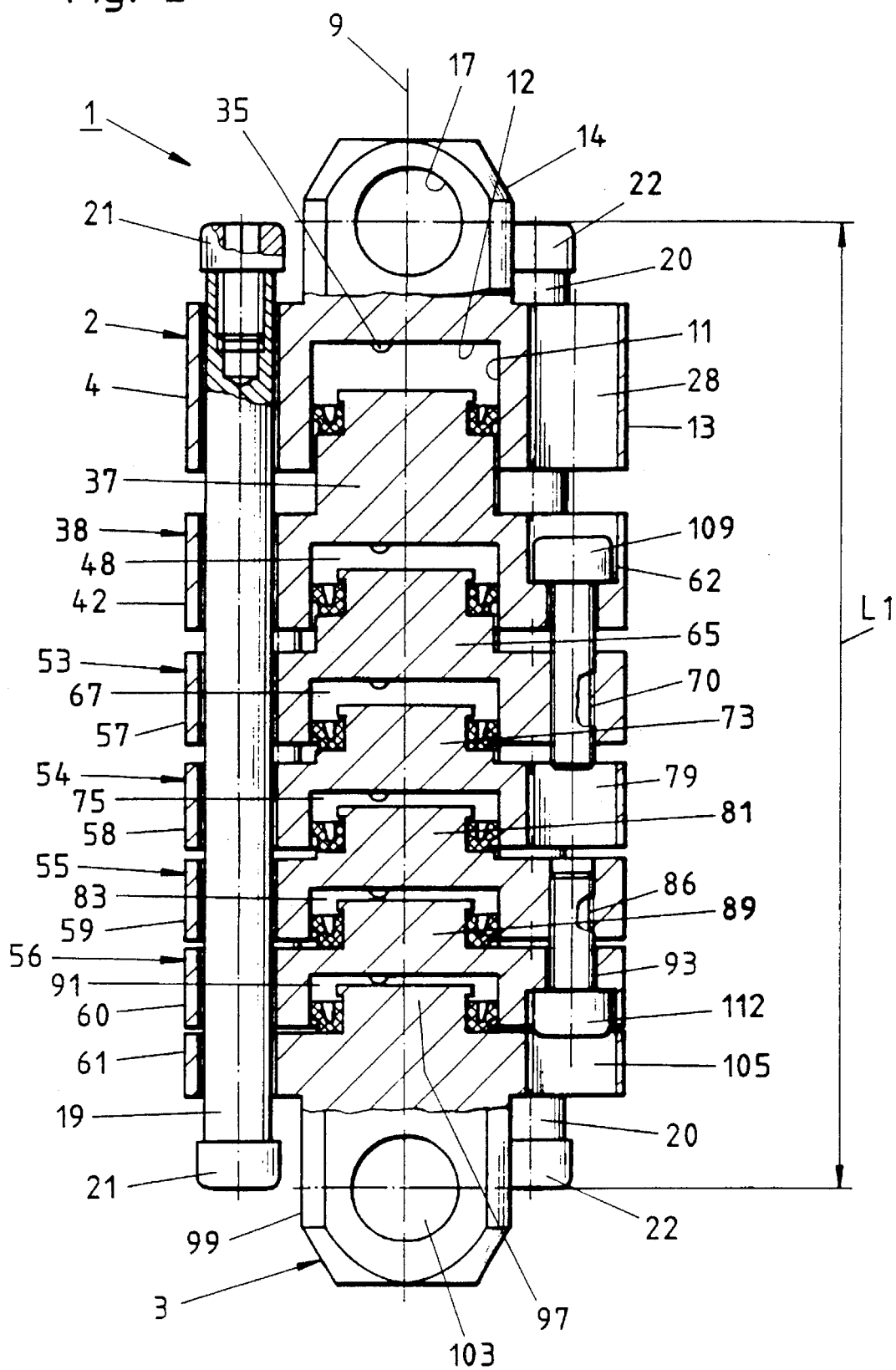
FIG. 2 is a cross-sectional view taken through the actuator along the section line II—II in FIG. 1, and in which the upper and lower parts correspond to a view seen in the direction of the arrow V in FIG. 1.

The flange 42 is provided with identically developed stepped holes, the positions of which are fixed by the points of intersection of the line 30 with the pitch circle 18. One stepped hole 62 thereof is shown in FIG. 2. Furthermore, the flange 42 is developed with identically developed threaded holes the positions of which are fixed by the points of intersection of the line 25 with the pitch circle 18. One threaded hole 63 thereof is shown in FIG. 3. Finally, the flange 42 is also developed with identically developed holes, the positions of which are fixed by the points of intersection of the line 33 with the pitch circle 18. One hole 64 thereof is shown in FIG. 3.

A second connecting part 53 is developed with a piston 65 which, like the piston 37, is provided with a sealing cuff (not provided with reference numeral) and terminates at an edge 66 of the flange 57. The piston 65 is received with clearance in the cylinder 48 and displaceably in the direction of the longitudinal axis 9. The piston 65 and the cylinder 48 form a piston-cylinder unit B. With this arrangement, the result is obtained that the connecting part 38 comprises both the piston 37 of the piston-cylinder unit A and the cylinder 48 of the adjacent piston-cylinder unit B.

The flange 57 is developed with a cylinder 67 which extends from an edge 68 corresponding to the cylinder 48 on the longitudinal axis 9 and has a bottom with a debouching channel (neither designated by reference numeral). The flange 57 is provided with identically developed stepped holes, the positions of which are fixed by the points of intersection of the line 33 with the pitch circle 18. One stepped hole 69 thereof is shown in FIG. 3. Furthermore, the flange 57 is developed with identically developed threaded holes the positions of which are fixed by the points of intersection of the line 30 with the pitch circle 18. One threaded hole 70 thereof is shown in FIG. 2. Finally, the flange 57 is also developed with identically developed holes, the positions of which are fixed by the points of intersection of the line 25 with the pitch circle 18. One hole 71 thereof is shown in FIG. 3. The flange 57 is provided on the outside with an outer surface 72 which is similar to the outer surface 13.

The connecting part 54 is developed with a piston 73 which, like the piston 37, is provided with a sealing cuff (not designated by reference numeral) and ends at an edge 74. The piston 73 is received with clearance within the cylinder 67 and displaceably in the direction of the longitudinal axis 9. The piston 73 and the cylinder 67 form a piston-cylinder unit C. With this arrangement, the result is obtained that the connecting part 53 comprises both the piston 65 of the piston-cylinder unit B and the cylinder 67 of the adjacent piston-cylinder unit C.

The flange 58 is developed with a cylinder 75 which extends from an edge 76 corresponding to the cylinder 48 on the longitudinal axis 9 and has a bottom with a debouching channel (neither designated by reference numeral). The flange 58 is provided with identically developed threaded holes, the positions of which are determined by the points of intersection of the line 25 with the pitch circle 18. One threaded hole 77 thereof is shown in FIG. 3. Furthermore, the flange 58 is developed with identically developed threaded holes, the positions of which are determined by the points of intersection of the line 33 with the pitch circle 18. One threaded hole 78 thereof is shown in FIG. 3. Finally, the flange 58 is also developed with identically developed holes, the positions of which are fixed by the points of intersection of the line 30 with the pitch circle 18. One hole 79 thereof is shown in FIG. 2. The flange 58 is provided on the outside with an outer surface 80 which is similar to the outer surface 13.

The connecting part 55 is developed with a piston 81 which, like the piston 37, is developed with a sealing cuff (not provided with reference numeral) and terminates at an edge 82. The piston 81 is received with clearance in the cylinder 75 and displaceably in the direction of the longitudinal axis 9. The piston 81 and the cylinder 75 form a piston-cylinder unit D. With this arrangement, the result is obtained that the connecting part 54 has the piston 73 of the piston-cylinder unit C and the cylinder 75 of the adjacent piston-cylinder unit D.

The flange 59 is developed with a cylinder 83 which extends from an edge 84 corresponding to the cylinder 48 on the longitudinal axis 9 and has a bottom with a debouching channel (neither designated by reference numeral). The flange 59 is provided with identically developed stepped holes, the positions of which are determined by the points of intersection of the line 25 with the pitch circle 18. One stepped hole 85 thereof is shown in FIG. 3. Furthermore, the flange 59 is developed with identically threaded holes, the positions of which are determined by the points of intersection of the line 30 with the pitch circle 18. One threaded hole 86 thereof is shown in FIG. 2. Finally, the flange 59 is also developed with identically developed holes, the positions of which are determined by the points of intersection of the line 33 with the pitch circle 18. One hole 87 thereof is shown in FIG. 3. The flange 59 is provided on the outside with an outer surface 88 which is similar to the outer surface 13.

The connecting part 56 is developed with a piston 89 which, like the piston 37, is provided with a sealing cuff (without reference numeral) and terminates at an edge 90. The piston 89 is received with clearance in the cylinder 83 and displaceably in the direction of the longitudinal axis 9. The piston 89 and the cylinder 83 form a piston-cylinder unit E. With this arrangement, the result is obtained that the connecting part 55 has the piston 81 of the piston-cylinder unit D and the cylinder 83 of the adjacent piston-cylinder unit E.

The flange 60 is developed with a cylinder 91 which extends from an edge 92 corresponding to the cylinder 48 on the longitudinal axis 9 and has a bottom with a debouching channel (neither designated by reference numeral). The flange 60 is provided with identically developed stepped holes, the positions of which are determined by the points of intersection of the line 30 with the pitch circle 18. One stepped hole 93 thereof is shown in FIG. 2. Furthermore, the flange 60 is developed with identically developed threaded holes, the positions of which are fixed by the point of intersection of the line 33 with the pitch circle 18. One threaded hole 94 thereof is shown in FIG. 3. Finally, the flange 60 is furthermore developed with identically developed holes, the positions of which are fixed by the points of intersection of the line 25 with the pitch circle 18. One hole 95 thereof is shown in FIG. 3. The flange 60 is provided on the outside with an outer surface 96 similar to the outer surface 13.

The second end part 3 is developed with a piston 97 which, like the piston 37, is provided with a sealing cuff (not designated by reference numeral) and terminates at an edge 98. The piston 97 is received with clearance in the cylinder 91 and displaceably in the direction of the longitudinal axis 9. The piston 97 and the cylinder 91 form a piston-cylinder unit F.

With this arrangement, the result is obtained that the connecting part 56 comprises both the piston 89 of the piston-cylinder unit E and the cylinder 91 of the adjacent piston-cylinder unit F.

The flange 61 is provided with a lug 99 thereon, which terminates at an edge 100. The lug 99 is provided with two surfaces 101 and 102 which are parallel to each other and to the longitudinal axis 9. In the lug 99 there extends a hole 103 the axis of which intersects the longitudinal axis 9 at about 90 degrees.

The lug 99 corresponds in its development and angular position with respect to the longitudinal axis 9 to the lug 14 of the first end part 2.

The flange 61 is provided with identically developed stepped holes, the positions of which are fixed by the points of intersection of the line 33 with the pitch circle 18. One stepped hole 104 thereof is shown in FIG. 3. Furthermore, the flange 61 is developed with identically developed holes, the positions of which are fixed by the points of intersection of the line 30 with the pitched circle 18. One recess or hole 105 thereof is shown in FIG. 2. Finally, the flange 61 is also developed with identically developed holes, the positions of which are fixed by the points of intersection of the line 25 with the pitch circle 18. One hole 106 thereof is shown in FIG. 3. The flange 61 is provided on the outside with an outer surface 107 similar to the outer surface 13.

As can be noted from FIGS. 2 and 3, the pistons 37, 65, 73, 81, 89, 97, and the cylinders 11, 48, 67, 75, 83, 91 are so dimensioned in their length in the direction of the longitudinal axis 9 that the piston-cylinder unit A can have a stroke length ha, B a stroke length hb, C a stroke length hc, D a stroke length hd, E a stroke length he, and F a stroke length hf. Furthermore, it is also arranged that all pistons 37, 65, 73, 81, 89, 97, have a clearance of about 1 millimeter with respect to the corresponding cylinder bottoms in their positions retracted in the cylinders 11, 48, 67, 75, 83, 91. The stroke length ha to hf are preferably arranged to in the proportion hf:he:hd:hc:hb:ha=1:2:4:8:16:32.

Each of the piston-cylinder units A to F is fixed in position in the direction of the longitudinal axis by two diametrically arranged screws. The screws are threaded into the threaded holes mentioned above and are turnable with difficulty against a moment of friction, and thus secured against unintended turning.

In more detail, the piston-cylinder unit A is limited in its stroke length ha by the screws 26, 27, the piston-cylinder unit B is limited in its stroke length hb by two screws, one of which is shown as screw 109 in FIG. 2, the piston-cylinder unit C is limited in its stroke length hc by two screws, one of which is shown in FIG. 3 as screw 110, the piston-cylinder unit D is limited in its stroke length hd by two screws, one of which is shown as screw 111 in FIG. 3, the piston-cylinder unit E is limited in its stroke length he by two screws, one of which is shown as screw 112 in FIG. 2, and the piston-cylinder unit F is limited in its stroke length hf by two screws, one of which is shown as screw 113 in FIG. 3.

The screws 26, 27, 109 to 113 form a means for fixing the respective sizes of the stroke length ha, hb, hc. hd, he, and hf.

It is also pointed out that, in the flanges 53 to 56, there are arranged channels (not designated by reference numerals) which correspond to the construction of the channel 50. With the development described of the flanges 4, 42, and 57 to 61, the result is obtained that the channels of all piston-cylinder units A to F are arranged aligned in the direction of the longitudinal axis 9.

The actuator 1 is connected for being actuated by a pneumatic control (not shown), in which connection the pressurized fluid can be fed to the individual piston-cylinder units A to F in accordance with a distinct mathematical interrelationship and/or with a control program as known, for instance, from Federal Republic of Germany 31 18 964 C2 (corresponding to U.S. Pat. No. 4,412,498 at column 5, lines 25–33).

The manner of operation of the actuator 1 is as follows:

In vented condition, all piston-cylinder units A to F assume a retracted position upon being acted on by equally large, oppositely directed forces F1 and F2 on the actuator 1. In this position the edges 36 and 43, 47 and 66, 68 and 74, 76 and 82, 84 and 90, 92 and 9 rest against each other. Upon the action of the pressurized fluid, at least one of the piston-cylinder units A to F assumes an expanded position. In this connection, the heads of the corresponding screws of that at least one piston-cylinder unit A to F comes into abutment in the corresponding stepped holes.

Depending on how the piston-cylinder units A to F are controlled, the actuator 1 expands against the forces F1 and F2 up to a maximum length L1, as shown in FIGS. 2 and 3. During the effecting of the changes in length, the first and second end parts 2 and 3 and the connecting parts 38 and 53 to 56 shift slidingly on the guide rods 19 and 20. The latter serve thus for guiding the end parts 2, 3 and the connecting parts 38, 53 to 56. The guide rods are limited in their possible axial displacements by the heads of the screws 21 and 22.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An actuator adapted to be actuated by pressurized fluid, comprising:

a plurality of piston-cylinder units;

each piston-cylinder unit comprising a piston and a cylinder, the piston being arranged for movement within the cylinder along a longitudinal axis of said actuator;

said piston-cylinder units being arranged adjacent to each other and interconnected so that an overall stroke length of said actuator corresponds to a sum of respective stroke lengths of said pistons within said cylinders;

each piston-cylinder unit having an arrangement for setting a respective stroke length of the corresponding piston within the corresponding cylinder;

said actuator comprising a connecting part, said connecting part comprising a single unitary component which includes the piston of one of the piston-cylinder units and the cylinder of another, adjacent piston-cylinder unit, the piston of the connecting part being arranged for movement in an adjacent cylinder to form one of the piston-cylinder units and the cylinder of the connecting part being arranged to receive an adjacent piston to form another of the piston-cylinder units;

said connecting part having a channel for receiving and guiding said pressurized fluid into said connecting part; wherein each of said piston cylinder units include a pressure application area upon which said pressurized fluid is applied, each pressure application area of each of said piston cylinder units being independent of pressure application areas of other of said piston cylinder units.

2. An actuator according to claim 1, wherein the actuator comprises a first end part at one end of the actuator and including the piston of one of the piston-cylinder units, and a second end part at the other end of the actuator and including the cylinder of one of the piston-cylinder units.

3. An actuator according to claim 2, wherein the first and second end parts and the connecting part each have continuous outer surfaces.

4. An actuator according to claim 3, wherein each arrangement for setting a respective stroke length comprises a pair of screws which connect one of the end parts to the connecting part so as to limit a relative stroke length therebetween, the screws being received in recesses formed in the respective end part and thereby accessible for being turned by a screw-turning tool, the recesses being located outside of and on opposite sides of the piston-cylinder units.

5. An actuator according to claim 3, wherein the channel for receiving the pressurized fluid extends from said continuous outer surface of the connecting part into the cylinder integrally formed within said connecting part.

6. An actuator according to claim 5, further comprising a plurality of connecting parts each having a channel for receiving and guiding said pressurized fluid into a respective connecting part, wherein the channels of said connecting parts are substantially aligned along a direction of the longitudinal axis of the actuator and extend in a direction substantially perpendicular to the longitudinal axis of the actuator.

7. An actuator according to claim 6, further comprising a guide means for maintaining a rotary position of each of the end parts and the connecting parts relative to the longitudinal axis of the actuator.

8. An actuator according to claim 5, wherein said channel is substantially straight.

9. An actuator according to claim 8, wherein said channel is arranged substantially radially, with respect to the longitudinal axis of the actuator.

10. An actuator according to claim 3, wherein each arrangement for setting a respective stroke length comprises at least one screw which interconnects the connecting part with at least one of the end parts so as to limit relative movement therebetween.

11. An actuator according to claim 10, wherein the at least one screw is received in a recess in said at least one end part and thereby being accessible for being turned by a screw-turning tool.

12. An actuator according to claim 11, wherein said screw-turning tool is an Allen wrench.

13. An actuator according to claim 3, wherein the arrangement for setting a respective stroke length comprises at least one screw which is connected to the connecting part so as to limit movement thereof.

14. An actuator comprising:

a) a plurality of piston-cylinder units each including a piston and a cylinder being arranged for movement relative to each other, the piston-cylinder units being arranged adjacent to each other and interconnected so that an overall stroke length of said actuator corresponds to a sum of respective stroke lengths of said pistons within said cylinders; and b) a connecting part comprising a single unitary component which includes the piston of one of the piston-cylinder units and the cylinder of another, adjacent piston-cylinder unit, the piston of the connecting part being arranged for movement in an adjacent cylinder to form one of the piston-cylinder units and the cylinder of the connecting part being arranged to receive an adjacent piston to form another of the piston-cylinder units; wherein each of said piston cylinder units include a pressure application area upon which said pressurized fluid is applied, each pressure application area of each of said piston cylinder units being independent of pressure application areas of other of said piston cylinder units.

15. The actuator of claim 14, wherein the actuator further comprises a first end part at one end of the actuator and including the piston of one of the piston-cylinder units, and a second end part at the other end of the actuator and including the cylinder of one of the piston-cylinder units.

16. The actuator of claim 14, wherein the connecting part has a first sealing member extending from the piston formed on the connecting part to the adjacent cylinder and a second sealing member extending from the cylinder formed in the connecting part to the adjacent piston.

17. The actuator of claim 14, wherein the connecting part has a channel for receiving and guiding a pressurized fluid into the cylinder of a respective piston-cylinder unit.

18. The actuator of claim 17, further comprising a plurality of connecting parts each having a channel for receiving and guiding said pressurized fluid into a respective connecting part, wherein the channels of the connecting parts are substantially aligned along a direction of a longitudinal axis of the actuator and extend in a direction substantially perpendicular to the longitudinal axis of the actuator.

19. The actuator of claim 18, wherein the piston of each of the connecting parts is formed at an upper surface of the respective connecting part and the cylinder of each of the connecting parts is formed at a lower surface of the respective connecting part, and a connecting flange is formed at a side surface of each of the connecting parts.

20. The actuator of claim 18, wherein an outer surface of each of the connecting parts is continuous.

21. The actuator of claim 18, further comprising a guide means for maintaining a rotary position of each of the end parts and the connecting parts relative to the longitudinal axis of the actuator.

22. The actuator of claim 14, wherein each of the piston-cylinder units has a device for setting a respective stroke length of the corresponding piston with the corresponding cylinder.

23. The actuator of claim 22, wherein each device for setting a respective stroke length comprises a pair of screws which connect a respective end part to the connecting part so as to limit a relative stroke length therebetween, the screws being received in recesses formed in the respective end part and being accessible for being turned by a screw-turning tool, the screws being located spaced from and on opposite sides of the piston-cylinder units.

24. The actuator of claim 23, further comprising a guide means for maintaining a rotary position of each of the end parts and the connecting part relative to a longitudinal axis of the actuator.

* * * * *